United States Patent Office 3,846,303
Patented Nov. 5, 1974

3,846,303
METHOD AND APPARATUS FOR CONTROLLING FLOW TO A BATTERY OF FILTERS
Joseph H. Duff, Basking Ridge, N.J., assignor to Gulf Degremont, Inc., Liberty Corner, N.J.
Filed Oct. 15, 1973, Ser. No. 406,306
Int. Cl. B01d 23/20
U.S. Cl. 210—73      6 Claims

ABSTRACT OF THE DISCLOSURE

Raw water is distributed to individual filters in a bank of filters operated in parallel from a splitter box in which the raw water for each of the filters overflows one of a plurality of weirs of the same height in the splitter box to enter an inlet line for the filter. The upper end of the splitter box is closed and provided with a vent line extending upwardly therefrom whereby upon increasing the rate of flow to the splitter box or reduction in flow capacity of one of the filters the level of the raw water entering the splitter box rises within the splitter box into the vent line to increase the pressure available for forcing water through the filters.

---

This invention relates to a method and apparatus for controlling liquid flow and more particularly to the distribution of liquids to a battery of filters operated in parallel.

Recent emphasis on improving the quality of waters discharged into streams has greatly increased the volume of water that is filtered to remove solid contaminants before the water is discharged as an effluent stream. Examples of installations in which large volumes of water are filtered are the tertiary filtration of sewage and the cleaning up of industrial wastes such as wastes from steel mills or paper mill wastes. The required high filtration capacity is frequently accomplished by operating a battery of filters in parallel.

Typical filters are vessels containing one or more beds of sand through which the water drains. Water is introduced into the filter vessel above the filter bed, drains through the filter bed, and is discharged from the filter. Solid contaminants separated from the water eventually plug the filter bed sufficiently to make necessary reconditioning of the filter bed by backwashing to remove the contaminants. The cleaned filter is then returned to service in the battery.

The conventional method of operating a battery of filters is to maintain equal flow rates through each of the filter units. Control of flow through the filters is accomplished by delivering the raw water into an open splitter box having a plurality of weirs of the same height. Water flowing over each weir enters an inlet line for a separate filter. The open splitter box is located at an elevation above the filters that will provide sufficient head to force the water through a clean filter bed at the maximum contemplated rate or at the maximum acceptable pressure drop when a filter becomes clogged. Because the peak flow rate in sewage treatment is often two or three times the normal rate, and the peak flow rate in other filtration systems may be substantially above the average rate, the splitter box is located at an elevation substantially higher than is required for normal operations.

As the flow capacity of a single filter in a battery decreases because of the deposition of solid contaminants in the filter bed, the increased pressure required to maintain flow through the filter is provided by the water rising in the inlet line to that filter. When the water level reaches the weir in the splitter box, the filter must be withdrawn from the battery and cleaned and flow to the spliter box reduced accordingly. In such operation of a battery of filters, the rate of flow through each of the filters is substantially equal and the variations in the resistance to flow through the different filters is taken care of by the differences in level of water in the inlet pipes to the filter. A typical installation of a battery of filters in which the water to be filtered is delivered from a splitter box is illustrated in U.S. Pat. No. 2,879,893 of Stebbins.

The principal objection to the open splitter box method of delivering water to a battery of filters is the necessity of locating the splitter box at a height well above that required for normal operations. Then, even when both the resistance to flow through the filters and the rate of flow is low, the water must be pumped to the maximum height contemplated during any stage of operation of the filters. For example, even though normal operation of the filters only requires a head of 8–12 feet above the top of the filter bed, the splitter box may be located 35–40 feet above the top of the filter bed to provide the head necessary when the filter bed becomes partially blocked, or to take care of peak loads on the filters. Because of the large volume of water flowing to the filters the cost of the power required to raise the water to the splitter box is an important factor in the operating costs of the filters.

Another method of operation of a battery of filters in parallel is to deliver water to be filtered from a delivery pump into a manifold. Opening from the manifold is a separate raw water inlet line to each of the filter units. In this method, known as the variable declining rate method, the pressure on the inlet surface of the filter bed of each of the filters is the same but the rates at which the raw water flows through the different filters varies depending upon the resistance to flow through the filters. As a single filter bed in a battery becomes plugged, the increased pressure drop through that filter bed results in an increase in the pressure on the manifold and forces water through other filter beds at a higher rate.

When a filter unit has been cleaned and is returned to service in a battery using the variable declining rate method for control of flow through the filters, the flow surges through the clean filter bed. In many applications the filtration rate must be kept below a certain maximum to insure proper removal of solid contaminants. Often the rate of flow of a freshly cleaned filter unit in a battery using the variable declining rate method will exceed the maximum acceptable rate.

This invention resides in a method and apparatus for controlling the flow through filters in a battery of filters connected in parallel in which the raw water is delivered into a splitter box located at an elevation only slightly above the filters adequate to cause normal flow rates through the filters. When an increase in pressure is needed, either because of increased resistance to flow in a filter bed or increased rate of flow to the splitter box, the level of water in the splitter box rises. The arrangement of the splitter box permits the maximum acceptable pressure to be applied to the filters. Such arrangement may consist in either a splitter box having its upper end closed and a vent line extending upwardly a distance adequate to provide the maximum pressure or a splitter box having walls extending a distance above the weirs adequate to develop the desired maximum pressure.

Figure 1:
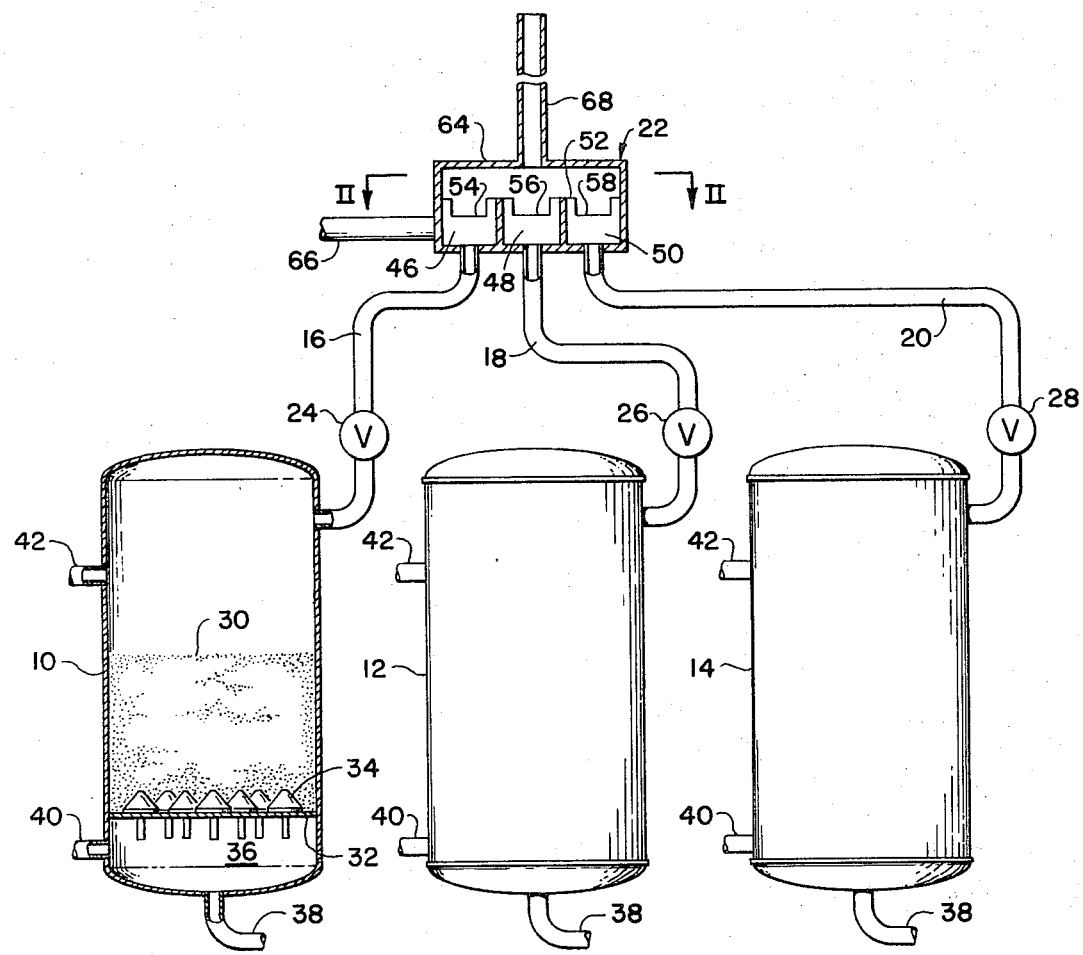
FIG. 1 is an elevational view, partially in vertical section, of a battery of three filters connected to a preferred embodiment of a splitter box constructed in accordance with this invention.

Referring to FIG. 1, three filters 10, 12 and 14 are shown connected in parallel. The filters 10, 12 and 14 have raw water inlet lines 16, 18 and 20, respectively, connecting the upper ends of the filters with a splitter box 22. Inlet lines 16, 18 and 20 are provided with inlet valves 24, 26 and 28, respectively, which can be closed when the filters are backwashed. This invention is, of course, not limited to a battery of three filters but can be used wherever a plurality of filters are operated in parallel.

Each of filters 10, 12 and 14 has a filter bed, indicated by reference numeral 30 in filter 10 and not shown in filters 12 and 14, of particulate material such as sand supported on an apertured bed plate 32. Strainers 34 mounted in the bed plate prevent movement of the sand through the apertures in the bed plate into a plenum 36 below the bed plate. A filtered water outlet line 38 extends from the lower end of each of the filters for delivery of filtered water to a filtered water storage compartment or to waste.

Each of filters 10, 12 and 14 has a backwash water inlet line 40 opening into the plenum 36 below the apertured bed plate and a backwash water outlet line 42 opening into the filter above the upper surface of the filter bed 30. Lines 38, 40 and 42 are provided with suitable valves, not shown in the drawings, for control of flow of water through those lines in accordance with conventional procedures for backwashing filters.

Figure 2:
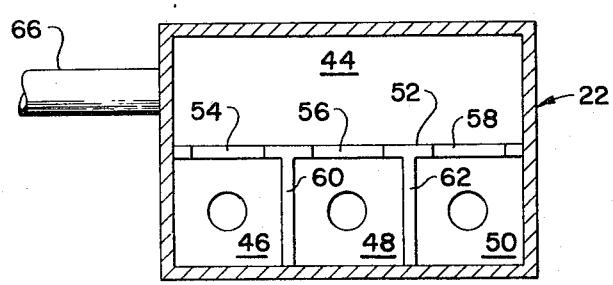
FIG. 2 is a horizontal sectional view of the splitter box along the section line II—II in FIG. 1.

Referring to FIG. 2 of the drawings, splitter box 22 has an inlet compartment 44 separated from a plurality of outlet compartments 46, 48 and 50 by a wall 52. Between the inlet compartment 44 and the outlet compartments 46, 48 and 50 are weirs 54, 56 and 58. Walls 60 and 62 separate the outlet compartments from one another. The upper end of splitter box 22 is closed by a top 64, as shown in FIG. 1, which allows pressure to be applied to water in the outlet compartments.

Opening into the inlet compartment 44 of splitter box 22 is a raw water delivery line 66. Extending upwardly from the splitter box 22 is a vent line 68 that opens through the top 64 of the splitter box. Vent line 68 extends upwardly from the splitter box a distance above the weirs 54, 56 and 58 fifty percent or more of the distance the weirs are above the top of the filter beds 30 to a level that will impress the maximum permissible pressure on the filters.

In the operation of the apparatus illustrated in the drawings, raw water to be filtered is delivered through raw water delivery line 66 into inlet compartment 44 of the splitter box. The raw water is divided into streams that overflow the weirs 54, 56 and 58 into the outlet compartments 46, 48 and 50 and then flows through inlet lines 16, 18 and 20 into filters 10, 12 and 14. Assuming that all of the filter beds are clean and that the rate of delivery of raw water into the splitter box 22 is at the normal design rate, the water level in the inlet lines drops to a level well below the level of weirs 54, 56 and 58. Because the weirs are at the same height, the rate of flow of water into all of the filters is substantially equal.

As filtration continues, one or more of the filter beds may become partially plugged and cause the raw water to back-up into the inlet line to the plugged filter to a level which eventually is higher than the level of the weir. That filter then handles less water than the other filters and the excess of water is diverted in the splitter box into the filters that are not plugged. If the other filters should become partially plugged, the raw water will eventually back-up into the vent line 68 and thereby apply a greater pressure on the raw water to force it through the filter beds at the necessary rate.

The operation of the flooded splitter box 22 is similar when the rate of delivery of raw water into the splitter box exceeds the normal rate. The filters can handle the peak loads of raw water only if there is an increased pressure drop through the filters. The increased pressure necessary to force the raw water through the filters is obtained by the raw water backing up into the vent 68. During the period that the weirs are flooded and the raw water level rises into the vent 68, the filters operate on a variable declining rate type of operation. Only during periods of peak flow or when the rate of flow is reduced by plugged filters is it necessary to pump the raw water to an elevation capable of applying maximum pressure to the filters whereas in the conventional open splitter box it is necessary at all times to pump the raw water to that elevation.

The flooded splitter box is of principal utility when the peak rate of flow through the filter may be at least 50% higher than normal flow rates. In some types of operations, such as sewage treatment, the peak flow rates may be as much as two or even three times the normal rate. To obtain the advantage of a variable declining type of operation, the vent line 62 should open to the atmosphere at an elevation above the inlet surface of the filters at least fifty percent more than the elevation of the weirs in the splitter box above those inlet surfaces.

In an example of a typical installation, normal flow through a clean filter can be obtained when the level of raw water in the lines to the filter is 8–12 feet above the upper surface of the filter bed. The splitter box is preferably positioned so that the weirs are 20 feet above the upper surface of the filter bed. The filters will then operate under the conventional equal flow method until the pressure drop through the filter bed offering the greatest resistance to flow is 20 feet, i.e., 8–12 feet above the normal pressure drop through the filter bed. The vent line extends to a height of 40 feet above the upper surface of the filter bed. Further plugging of the filter or an increase in the rate of delivery of raw water to the splitter box will flood the splitter box and force the raw water level up into the vent line. During this period of operation the filter will operate with a variable declining rate, but without danger of passing water at excessive rates through a clean filter bed. When the liquid level reaches the top of the vent it is necessary either to reduce the rate of flow into the filters or shut down and take one or more of the filters out of service for cleaning and reconditioning of the filter bed.

With the typical installation described, it is necessary during most operations only to pump the raw water under a head adequate to raise it 20 feet above the upper surface of the filter beds. In the conventional operation using equal flow through the filters at all times, it was necessary at all times to pump the raw water to a level 40 feet above the filter beds.

Figure 3:
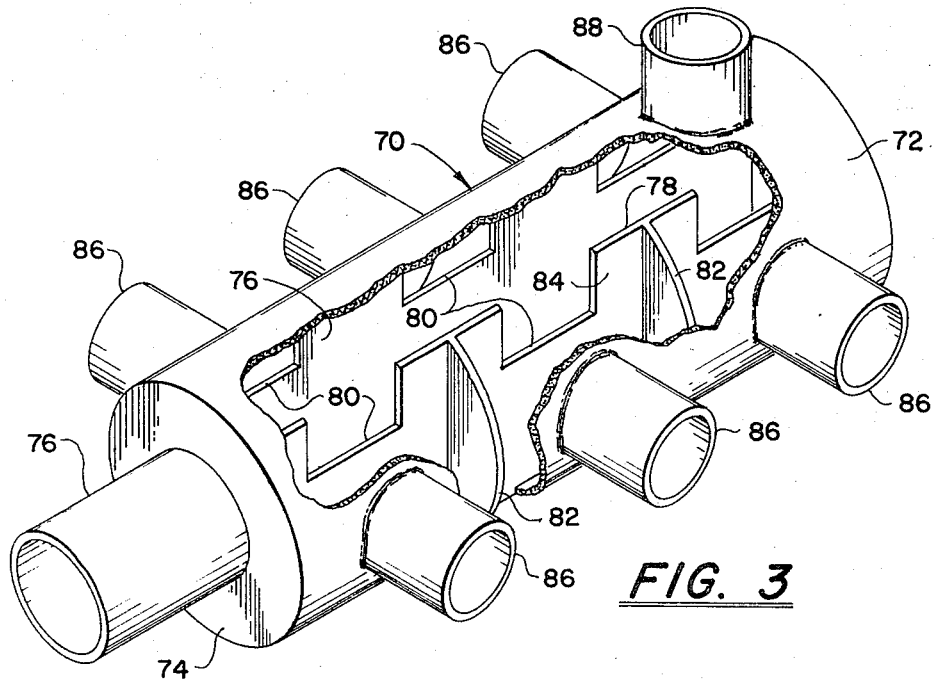
FIG. 3 is a perspective view, partially broken away, of an embodiment of a splitter box utilizing this invention.

In the embodiment of the invention illustrated in FIG. 3, the splitter box, indicated generally by reference numeral 70, comprises a horizontal section of pipe 72 closed at each of its ends. At the inlet end the closure is accomplished by an annular plate 74 having a raw water delivery line 76 opening therethrough. Extending longitudinally through pipe 72 are a pair of spaced apart walls 76 and 78 which combine with the pipe 72 and the end closures to form an inlet compartment. Each of walls 76 and 78 has a plurality of notches 80 spaced apart to form weirs for splitting the flow of raw water introduced into the splitter box. Baffles 82 between the weirs extend from the walls 76 and 78 to the wall of the pipe to divide the space between the walls and the pipe into a plurality of outlet compartments 84. Opening from each of compartments 84 is a nozzle 86 for connection to a raw water inlet line extending to a filter in a battery of filters. A vent nozzle 88 at the top of the splitter box is provided for connection to a vent line similar to that disclosed in FIG. 1 of the drawings.

Figure 4:
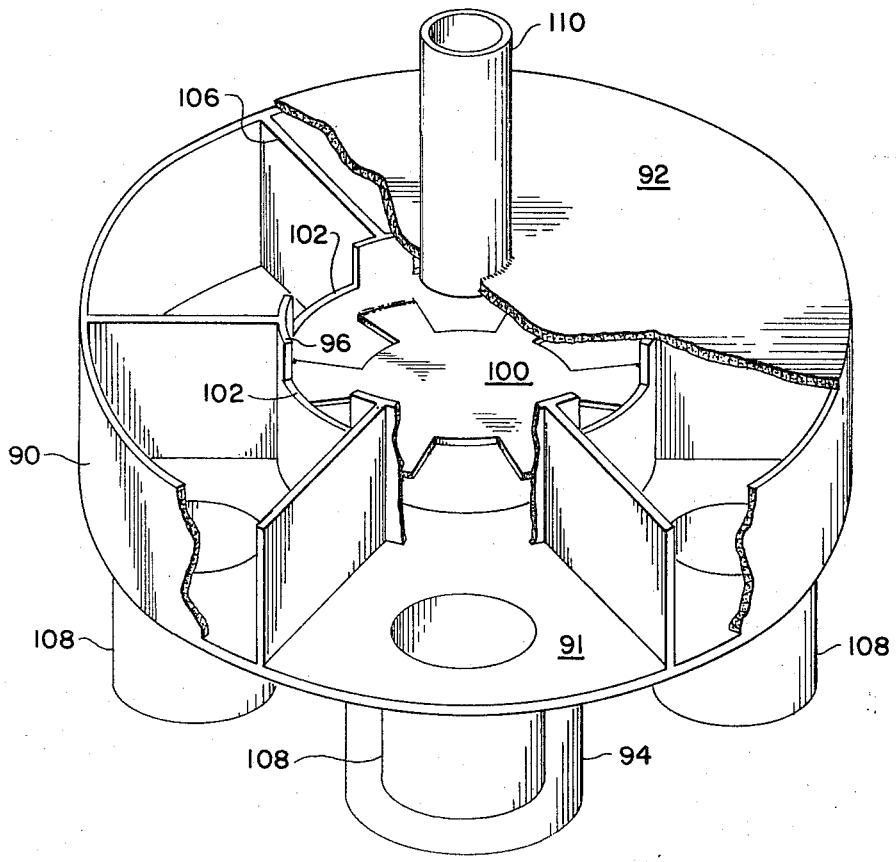
FIG. 4 is a perspective view, partially broken away, to show the construction of another embodiment of a splitter box incorporating this invention.

Another embodiment of a splitter box constructed in accordance with this invention is illustrated in FIG. 4 in which the splitter box comprises a drum 90 with a bottom 91 and having its upper end closed by a cover plate 92. A raw water inlet line 94 extends upwardly through the bottom to deliver raw water into an inlet compartment defined by a circular wall 96 within the drum extending from its bottom 91 to the cover plate 92. A baffle 100 over the outlet of raw water line 94 distributes the raw water within the splitter box. Inner wall 96 has a plurality of spaced apart weirs 102 over which raw water delivered into the splitter box overflows into outlet compartments 104. Radial walls 106 from the outer wall of the splitter box 90 to the inner wall 96 between the weirs 102 divide the annular space surrounding inner wall 96 in a plurality of outlet compartments. Each of the outlet compartments has an opening in the bottom thereof. A raw water inlet line 108 communicating with an opening in the bottom of an outlet compartment is provided for delivery of the raw water to each of the filters, not shown, in the battery of filters. A vent line 110 opens through cover plate 92 into the inlet chamber above the baffle 100.

The splitter box of this invention permits the operator to gain the advantages of both the equal flow per filter unit and the variable declining rate types of operation of a battery of filter units and still avoid the disadvantages of those methods. While the filters are relatively clean and the pressure drop through the filter is only from normal up to approximately 150 percent of normal, either because of increased resistance inthe filter or increased rates of flow, the splitter box causes the operation to be of the equal flow per unit type. The location of the splitter box at a low height above filter beds results, during operations causing a pressure drop in the range mentioned, in lower costs for pumping water to the splitter box. In contrast, the conventional equal flow per unit type of operation requires pumping the water to a splitter box located at the height that would supply the maximum acceptable pressure on the filters at all times including periods when clean filter units are operating at low throughputs.

Only when the resistance to flow through the filters is high does the flooded splitter box of this invention convert the operation to a variable declining rate type of operation. Since the resistance to flow through freshly cleaned filters is low, the problem of excessive flow rates through a single freshly cleaned filter in a battery that occurs in the usual declining rate type of operation is avoided.

I claim:

1. Apparatus for control of flow of liquid through a battery of filters connected in parallel and having filter media therein comprising a splitter box located above the filters, said splitter box having an inlet compartment and a plurality of outlet compartments, means for delivery of liquid to be filtered into the inlet compartment, a plurality of weirs within the splitter box, said weirs being constructed and arranged whereby there is a weir between the inlet compartment and each of the outlet compartments, a separate liquid feed line connecting each of the filters in the battery with one of the outlet compartments whereby liquid in an outlet compartment flows to a single filter, vent means opening from the upper end of the splitter box constructed and arranged to allow the level of the liquid to rise a height above the weirs at least one-half the height of the weirs above the filter media.

2. Apparatus as set forth in claim 1 in which the splitter box has a closed top and the vent means comprise a pipe extending upwardly from the closed top a distance above the weirs at least one-half the height of the weirs above the filter media and opens through the top of the splitter box.

3. Apparatus as set forth in claim 1 in which the splitter box is open at its upper end and the side walls of the splitter box extend upwardly above the weirs a height at least one-half the height of the weirs above the filter beds.

4. Apparatus as set forth in claim 1 in which the splitter box comprises a horizontal pipe, a plate extending longitudinally through the horizontal pipe to form the inlet compartment communicating with the feed line, dividing walls extending from the plate to the wall of the pipe opposite the inlet compartment to define a plurality of outlet comparments and notches in the plate forming weirs between the inlet compartment and each of the outlet compartments.

5. Apparatus as set forth in claim 1 in which the splitter box comprises a vertical drum, an inlet line opening into the central portion of the drum, an inner wall surrounding the inlet line to form an inlet compartment within the drum, a plurality of radial walls extending from the inner wall to the outer wall of the drum to divide the space therebetween into a plurality of outlet compartments, a notch in the inner wall constructed and arranged to form a weir between the inlet compartment and each of the outlet compartments, a top closing the upper end of the drum, and a vent pipe opening through the top and extending upwardly to a height above the weirs at least 50 percent of the height of the weirs above the filter media.

6. A method of distributing liquid to a battery of filters arranged in parallel comprising delivering water to a splitter box located above the filters and having a vent extending upwardly therefrom to a height above the filters at least 150 percent of the height of the weirs above the filters, flowing the water over a plurality of weirs of the same height in the splitter box to divide the water into a plurality of substantially equal volume streams, delivering each of the streams to a separate filter, and on one of plugging a filter and increasing the flow to the splitter box, increasing the level of water into the vent line of the splitter box to apply increased pressure to the filters.

References Cited

UNITED STATES PATENTS

| | | | |
|---|---|---|---|
| 2,879,893 | 3/1959 | Stebbins | 210—274 X |
| 3,545,615 | 12/1970 | Duffield | 210—405 X |
| 3,709,362 | 1/1973 | Lindstol | 210—108 |

JOHN ADEE, Primary Examiner

U.S. Cl. X.R.

210—287, 291